US 6,553,097 B2

(12) United States Patent
Hansen et al.

(10) Patent No.: US 6,553,097 B2
(45) Date of Patent: Apr. 22, 2003

(54) X-RAY TUBE ANODE ASSEMBLY AND X-RAY SYSTEMS INCORPORATING SAME

(75) Inventors: Steve Hansen, Port Washington, WI (US); Douglas J. Snyder, Brookfield, WI (US); Thomas Ebben, Sullivan, WI (US); John Warren, North Reading, MA (US); Paul Neitzke, Menomonee Falls, WI (US); Craig Higgins, Eau Claire, WI (US)

(73) Assignee: GE Medical Systems Global Technology Company, LLC, WI (US)

( * ) Notice: Subject to any disclaimer, the term of this patent is extended or adjusted under 35 U.S.C. 154(b) by 115 days.

(21) Appl. No.: 09/759,369

(22) Filed: Jan. 12, 2001

(65) Prior Publication Data

US 2002/0191749 A1 Dec. 19, 2002

Related U.S. Application Data

(63) Continuation-in-part of application No. 09/352,393, filed on Jul. 13, 1999, now Pat. No. 6,335,512.

(51) Int. Cl.[7] .................................................. H01I 35/00
(52) U.S. Cl. ........................................ 378/144; 378/143
(58) Field of Search ............................... 378/144, 143, 378/131, 119, 132

(56) References Cited

U.S. PATENT DOCUMENTS

| 3,694,685 A | 9/1972 | Houston ...................... 313/60 |
| 4,165,472 A | 8/1979 | Wittry ......................... 313/35 |
| 4,455,504 A | 6/1984 | Iversen ........................ 313/30 |
| 4,622,687 A | 11/1986 | Whitaker et al. ........... 378/130 |
| 4,674,109 A | 6/1987 | Ono ............................. 378/130 |
| 4,945,562 A | 7/1990 | Staub .......................... 378/130 |
| 4,969,172 A | 11/1990 | Fengler et al. .............. 378/125 |
| 5,091,927 A | 2/1992 | Golitzer et al. ............. 378/130 |
| 5,416,820 A | 5/1995 | Weil et al. ................... 378/130 |
| 5,530,733 A * | 6/1996 | Eggleston et al. .......... 378/125 |
| 5,579,364 A | 11/1996 | Osaka et al. ................. 378/130 |
| 5,652,778 A | 7/1997 | Tekriwal ..................... 378/132 |
| 5,673,301 A | 9/1997 | Tekriwal ..................... 378/130 |
| 5,978,447 A * | 11/1999 | Carlson et al. ............. 378/127 |
| 5,995,584 A | 11/1999 | Bhatt .......................... 378/125 |
| 6,021,174 A | 2/2000 | Campbell .................... 378/125 |

OTHER PUBLICATIONS

AMS Committee "F," "Aerospace Material Specification," Society of Automotive Engineers, Inc. p. 1–9, (1992).
ASM Handbook, ASM International, vol. 6—Welding, Brazing, and Soldering, p. 717–718, (1993).
Pinnow, K.E., et al, "P/M Tool Steels," ASM Handbook , ASM International, vol. 1, p. 780–783, (1990).
Smith, D.F., et al, "A History of Controlled, Low Thermal Expansion Superalloys," The Minerals, Metals & Materials Society, p. 253–272, (1990).
"Watch Your Productivity Take Off . . . With CPM® REX® 20 Cobalt–Free Cutting Tools," Crucible Materials Corp. Data Sheet for CPM REX 20 (1994).

* cited by examiner

Primary Examiner—Robert H. Kim
Assistant Examiner—Hoon K. Song
(74) Attorney, Agent, or Firm—Dougherty, Clements & Hofer; Christopher L. Bernard, Esq (57) ABSTRACT

An x-ray tube and x-ray system including an anode assembly having a shaft with a first end and a second end, a target connected to the first end of the shaft, and a rotor connected to the second end of the shaft. The anode assembly further having spaced-apart bearings rotatably supporting the shaft. The shaft, target, and rotor positioned relative to each other such that the center of gravity of the combination of the shaft, the target, and the rotor is positioned between the bearings. Additionally, the target and rotor may be flexibly interconnected allowing the beneficial use of gyroscopic effects.

27 Claims, 5 Drawing Sheets

X-RAY TUBE ANODE ASSEMBLY AND X-RAY SYSTEMS INCORPORATING SAME

CROSS-REFERENCE TO RELATED APPLICATIONS

The present application is a continuation-in-part of U.S. patent application Ser. No. 09/352,393, filed Jul. 13, 1999; now U.S. Pat. No. 6,335,512, U.S. patent application Ser. No. 09/751,631, filed Dec. 29, 2000, entitled "Thermal Energy Transfer Device and X-Ray Tubes and X-Ray Systems Incorporating Same"; and U.S. patent application Ser. No. 09/752,014, filed Dec. 29, 2000, entitled "X-Ray Tube Anode Cooling Device and Systems Incorporating Same".

BACKGROUND OF THE INVENTION

The present invention relates generally to an anode assembly for use within x-ray generating devices and x-ray systems and, more specifically, to x-ray tubes and x-ray systems having a rotating anode assembly.

Typically, an x-ray generating device, referred to as an x-ray tube, includes opposed electrodes enclosed within a cylindrical vacuum vessel. The vacuum vessel is commonly fabricated from glass or metal, such as stainless steel, copper, or a copper alloy. The electrodes include a cathode assembly positioned at some distance from the target track of a rapidly rotating, disc-shaped anode assembly. Alternatively, such as in industrial applications, the anode assembly may be stationary. The target track, or impact zone, of the anode assembly is generally fabricated from a low expansivity refractory metal with a high atomic number, such as a molybdenum or tungsten alloy. Further, to accelerate electrons used to generate x-rays, a voltage difference of about 60 kV to about 140 kV is commonly maintained between the cathode and anode assemblies. The hot cathode filament emits thermal electrons that are accelerated across the potential difference, impacting the target zone of the anode assembly at high velocity. A small fraction, typically less than 1%, of the kinetic energy of the electrons is converted to high-energy electromagnetic radiation, or x-rays, while the balance is contained in back-scattered electrons or converted to heat. The x-rays are emitted in all directions, emanating from a focal spot, and may be directed out of the vacuum vessel along a focal alignment path. In an x-ray tube having a metal vacuum vessel, for example, an x-ray transmissive window is fabricated into the vacuum vessel to allow an x-ray beam to exit at a desired location. After exiting the vacuum vessel, the x-rays are directed along the focal alignment path to penetrate an object, such as a human anatomical part for medical examination and diagnostic purposes. The x-rays transmitted through the object are intercepted by a detector or film, and an image of the internal anatomy of the object is formed. Likewise, industrial x-ray tubes may be used, for example, to inspect metal parts for cracks or to inspect the contents of luggage at an airport.

Since the production of x-rays in a medical diagnostic x-ray tube is by its very nature an inefficient process, the x-ray tube components operate at elevated temperatures. For example, the temperature of the anode's focal spot may run as high as about 2,700 degrees C., while the temperature in other parts of the anode may run as high as about 1,800 degrees C. The thermal energy generated during tube operation is typically transferred from the anode, and other components, to the vacuum vessel. The vacuum vessel, in turn, is generally enclosed in a casing filled with a circulating cooling fluid, such as dielectric oil, that removes the thermal energy from the x-ray tube. Alternatively, such as in mammography applications, the vacuum vessel may be cooled directly by air.

As discussed above, the primary electron beam generated by the cathode of an x-ray tube deposits a large heat load in the anode target. In fact, the target glows red-hot in operation. This thermal energy from the hot target is conducted and radiated to other components within the vacuum vessel. The oil or air circulating around the exterior of the vacuum vessel transfers some of this thermal energy out of the system. However, the high temperatures caused by this thermal energy subject the x-ray tube components to high thermal stresses that are problematic in the operation and reliability of the x-ray tube. As a result, x-ray tube components must be made of materials capable of withstanding elevated temperatures for extended periods of time. In particular, the anode assembly typically includes a shaft that is rotatably supported by a bearing assembly. The shaft may be made of, for example, high hardness tool steel. Due to the high temperatures associated with the operating target, the shaft may not be attached directly to the target. The integrity of the mechanical joint between the target and the shaft, however, must be maintained throughout service, since yielding at the mating surfaces may ultimately result in rotor-dynamic problems and possible premature x-ray tube failure.

Likewise, rotor-dynamic problems may be caused by unbalanced loading of the bearings. An x-ray tube bearing assembly generally consists of several sets of bearing balls and bearing races. A typical x-ray tube anode, and, specifically, a typical anode target, is configured such that the loads on the bearings proximal to the target are greater than the loads on the bearings distal to the target. This may lead to uneven and excessive wear on the bearing balls and races, especially in the presence of elevated temperatures. Uneven and excessive wear of the bearing balls and bearing races may result in increased friction, increased noise, and the ultimate failure of the bearing assembly.

BRIEF SUMMARY OF THE INVENTION

The present invention overcomes the aforementioned problems and provides a rotor-dynamically stable, or rotationally balanced, anode assembly having bearings that are subjected to balanced loading conditions. This anode assembly takes advantage of gyroscopic effects, allowing it to rotate at high speeds. Further, the anode assembly of the present invention has a high integrity mechanical joint between the target and the shaft.

In one embodiment, an anode assembly for use within an x-ray tube includes a shaft having a first end and a second end, a target connected to the first end of the shaft, a rotor connected to the second end of the shaft, and spaced-apart bearings rotatably supporting the shaft, the shaft, target, and rotor positioned relative to each other such that the center of gravity of the combination of the shaft, the target, and the rotor is positioned between the bearings.

In another embodiment, an x-ray system includes a vacuum vessel having an inner surface forming a vacuum chamber; a shaft having a first end and a second end, the shaft supported by the vacuum vessel; an anode assembly disposed within the vacuum chamber, the anode assembly including a target connected to the first end of the shaft; a cathode assembly disposed within the vacuum chamber at a distance from the anode assembly, the cathode assembly configured to emit electrons that strike the target of the anode assembly and produce x-rays; a rotor connected to the second end of the shaft; and spaced-apart bearings rotatably supporting the shaft, wherein the shaft, target, and rotor are positioned relative to each other such that the center of gravity of the combination of the shaft, the target, and the rotor is positioned between the bearings.

DETAILED DESCRIPTION OF THE INVENTION

In one embodiment, the anode assembly of the present invention includes a shaft having a first end and a second end. A low thermal expansivity refractory metal target is connected to the first end of the shaft and a rotor is connected to the second end of the shaft. Spaced-apart bearings rotatably support the shaft. The shaft, target, and rotor are positioned relative to each other and flexibly interconnected to create a strong gyroscopic effect. This gyroscopic effect provides the anode assembly with a large running speed range that is free from critical speeds.

In another embodiment, the anode assembly of the present invention includes a target having a radially-extending target body and an axially-extending target shaft. The target is secured to a shaft by a low thermal expansivity iron-based superalloy mounting hub. A bearing assembly, partially disposed within an inner bore of the target formed by the radially and axially-extending portions, supports the shaft. This setup contributes to a rotor-dynamically stable anode assembly with a center of gravity positioned such that the bearings are subjected to balanced loading conditions, minimizing friction, noise, and uneven/excessive wear of the bearings.

Figure 1:
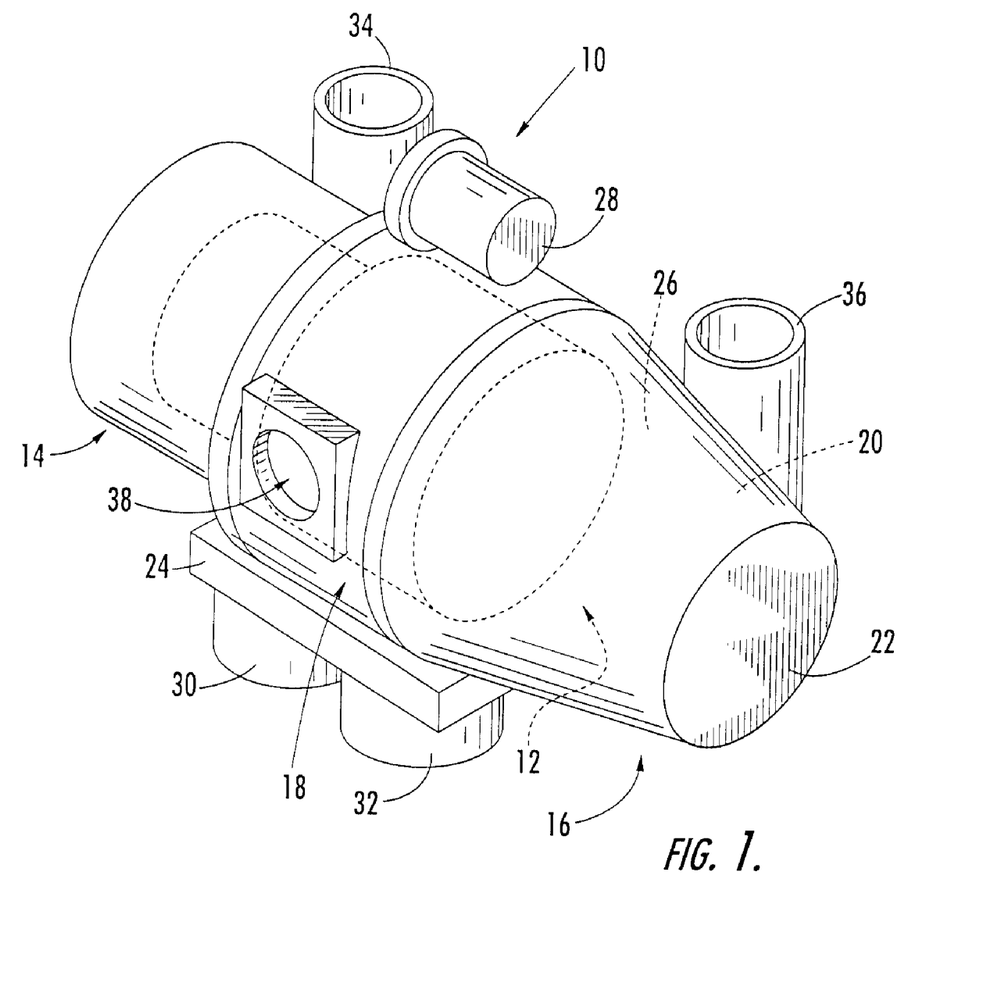
FIG. 1 is a perspective view of one embodiment of an x-ray tube assembly unit that contains one embodiment of an x-ray tube.

Referring to FIG. 1, one embodiment of an x-ray tube assembly unit 10, containing an x-ray generating device or x-ray tube 12, includes an anode end 14, a cathode end 16, and a center section 18 positioned between the anode end 14 and the cathode end 16. The x-ray tube 12 is disposed within the center section 18 of the assembly unit 10 in a fluid-filled chamber 20 formed by a casing 22. The casing 22 may, for example, be made of aluminum. The chamber 20 may, for example, be filled with dielectric oil that circulates throughout the casing 22, cooling the operational x-ray tube 12 and insulating the casing 22 from the high electrical charges within the x-ray tube 12. The casing 22 may, optionally, be lead-lined. Alternatively, such as in mammography applications, the vacuum vessel may be cooled directly by air. The assembly unit 10 also, preferably, includes a radiator 24, positioned to one side of the center section 18, that cools the circulating fluid 26. The fluid 26 may be moved through the chamber 20 and radiator 24 by an appropriate pump 28, such as an oil pump. Preferably, a pair of fans 30, 32 are coupled to the radiator 24, providing a cooling air flow to the radiator 24 as the hot fluid 26 flows through it. Electrical connections to the assembly unit 10 are provided through an optional anode receptacle 34 and a cathode receptacle 36. X-rays are emitted from the x-ray tube assembly unit 10 through an x-ray transmissive window 38 in the casing 22 at the center section 18.

Figure 2:
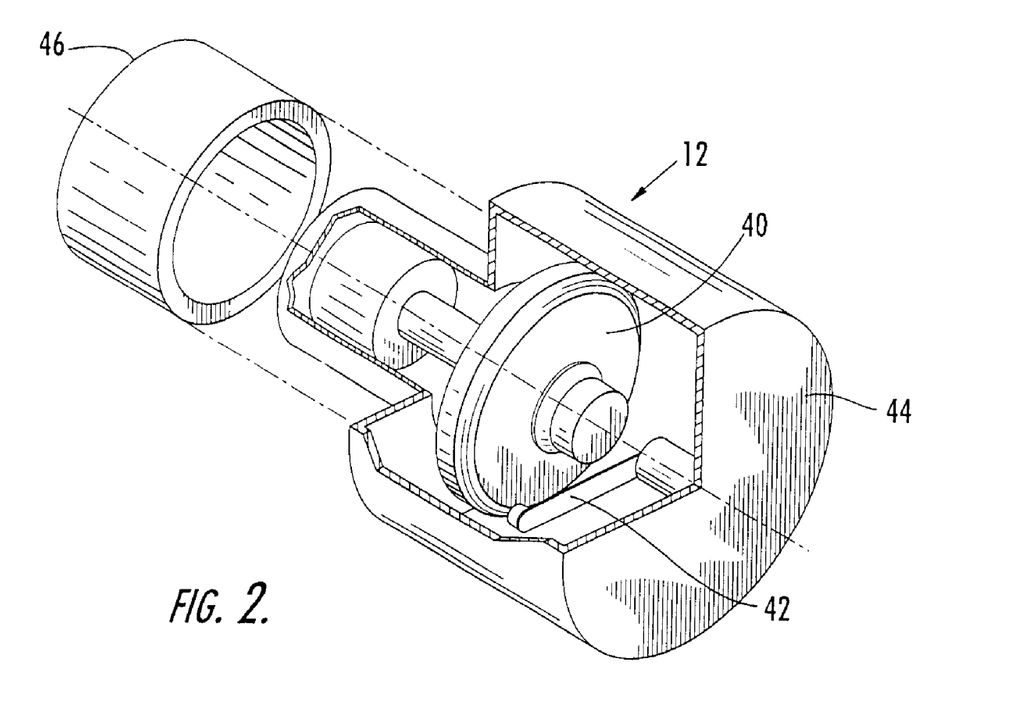
FIG. 2 is a sectional perspective view of the x-ray tube of FIG. 1 with a portion of the vacuum vessel cut-away and the stator exploded to reveal a portion of the anode assembly of the present invention.

Referring to FIG. 2, an x-ray generating device, or x-ray tube 12, includes an anode assembly 40 and a cathode assembly 42 disposed within a vacuum vessel 44. The vacuum vessel 44 may, for example, be made of stainless steel, copper, a copper alloy, or glass. The anode assembly 40 may optionally, for medical applications, be rotating. A stator 46 is positioned over the vacuum vessel 44 adjacent to the anode assembly 40. Upon the energization of an electrical circuit connecting the anode assembly 40 and the cathode assembly 42, which may produce a potential difference of about 20 kV to about 140 kV between the anode assembly 40 and the cathode assembly 42, electrons are directed from the cathode assembly 42 to the anode assembly 40. The electrons strike a focal spot located within a target zone of the anode assembly 40 and produce high-frequency electromagnetic waves, or x-rays, back-scattered electrons, and residual energy. The residual energy is absorbed by the components within the x-ray tube 12 as heat. The x-rays are directed through the vacuum existing within the vacuum chamber 44 and out of the casing 22 (FIG. 1) through the x-ray transmissive window 38 (FIG. 1), toward an object to be imaged, along a focal alignment path. The x-ray transmissive window 38 may be made of beryllium, titanium, aluminum, or any other suitable x-ray transmissive material. The x-ray transmissive window 38, and optionally an associated aperture and/or filter, collimates the x-rays, thereby reducing the radiation dosage received by, for example, a patient. As an illustration, in CT applications, the useful diagnostic energy range for x-rays is from about 60 keV to about 140 keV. In mammography applications, the useful diagnostic energy range for x-rays is from about 20 keV to about 50 keV. An x-ray system utilizing an x-ray tube 12 may also be used for radiography, angiography, fluoroscopy, vascular, mobile, and industrial x-ray applications, among others.

Figure 3:
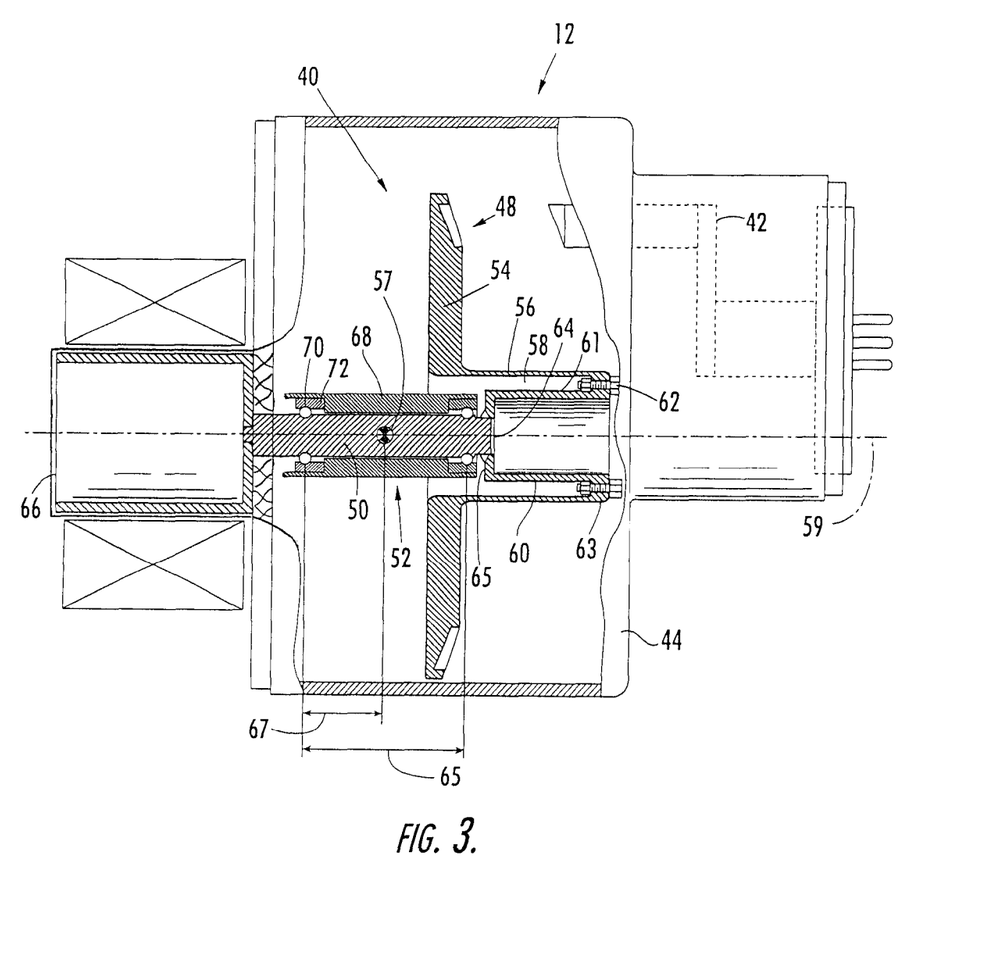
FIG. 3 is a partial cross-sectional, side view of one embodiment of the anode assembly.

Referring to FIG. 3, in one embodiment, an anode assembly 40 of an x-ray tube 12 typically includes a target 48 fixedly attached to the first end of a shaft 50 that is rotatably supported by a bearing assembly 52. The second end of the shaft 50 is fixedly attached to a rotor assembly 66. The target 48 may be a disk with a body made of graphite and having a low thermal expansivity refractory metal annular insert brazed to it. The insert forming the target track for receiving electrons from the cathode. Optionally, the target 48 may be integrally formed. The target 48 is preferably at least partially fabricated from a refractory metal with a high atomic number, such as a molybdenum or tungsten alloy. The target 48 provides a surface that electrons from the cathode assembly 42 strike, producing x-rays and residual thermal energy. The target 48 is an annular structure, having a radially-extending portion 54, or target body, and an axially-extending portion 56, or target shaft. The radially-extending target body 54 and the axially-extending target shaft 56 may be integrally formed, or they may be joined by, for example, inertial or friction welds. These radially and axially-extending portions 54 and 56 form an inner bore 58.

The target 48 rotates by rotation of the shaft 50, which may be coupled to the target 48 by a mounting hub 60. The mounting hub 60 includes an axially-extending annular wall 61 that includes an attachment structure at each end to fixedly attach to the shaft 50 and the axially-extending portion 56 of the target 48, respectively. For example, the attachment structure may include an outward-extending radial flange 63 projecting radially outward relative to the annular wall 61 or an inward-extending radial flange 65. The attachment of the mounting hub 60 to the shaft 50 and the target 48 may be achieved by a variety of methods, such as by using fasteners 62 and 64, welds, and combinations thereof. The fasteners may include, for example, mounting bolts and nuts, allowing simplified disassembly of the anode assembly 40 for maintenance. The shaft 50 may be made of, for example, high hardness tool steel. The mounting hub 60 may be made of, for example, a low thermal expansivity iron-based superalloy capable of retaining high strength when exposed to the high temperatures associated with the shaft/hub/target joint. The low thermal expansion coefficient of the superalloy closely matches the expansivity of the refractory metal target 48, thus minimizing the contact stresses generated by expansivity mismatch. The thermal expansion coefficient of the shaft 50 may be greater than the thermal expansion coefficient of the mounting hub 60, which may be greater than the thermal expansion coefficient of the target 48. The mounting hub 60 may be partially or fully disposed within the inner bore 58 of the anode assembly 40.

The target 48 and rotor 66, discussed above, comprise the two major masses of the anode assembly 40. Along with the shaft 50, they may be arranged such that they are flexibly interconnected, allowing each mass to have a separate and independent vibrational mode. Upon rotation, this allows the anode assembly 40 to take advantage of gyroscopic effects, providing the anode assembly 40 with a large running speed range free of critical speeds. For example, in one embodiment of an x-ray tube, the anode assembly 40 may be free of critical speeds from about 90 Hz to about 250 Hz. Additionally, this set-up allows the target to be thermally isolated from the bearing assembly by utilizing thin-walled mounting hub 60.

The primary electron beam generated by the cathode assembly 42 of an x-ray tube 12 deposits a large heat load in the target 48. In fact, the target 48 glows red-hot in operation. Typically, less than 1% of the primary electron beam energy is converted into x-rays, the balance being converted to thermal energy. The rotation of the target 48 distributes the area of the target 48 that is impacted by electrons, thus minimizing the operating temperature of the target 48. Greater rotational speed allows for a higher power x-ray tube 12. The rotating anode assembly 40 is generally rotated by a rotor 66 and induction motor assembly located at, and attached to, the end of the shaft 50 opposite from the target 48.

The bearing assembly 52, discussed above, includes a bearing support 68, bearing balls 70, and bearing races 72. The bearing support 68 is a cylindrical tube that provides support for the anode assembly 40 relative to the vacuum vessel 44. Bearing balls 70 and bearing races 72 are disposed within the bearing support 68 and provide for rotational movement of the target 48 by providing for rotational movement of the shaft 50. For example, typically at least two sets of bearing balls/races 70, 72 are disposed with the bearing support 68 in a spaced-apart relationship. The spaced-apart relationship of the sets of bearing balls/races 70, 72 helps to improve the rotational stability of the rotor 48. The bearing balls 70 and bearing races 72 are typically made of tool steel, or another suitable metal, and may become softened and even deformed by excessive or uneven loading in the presence of elevated temperatures. As shown in FIG. 3, in a preferred embodiment of the present invention, the bearing assembly 52 is at least partially disposed within the inner bore 58 of the anode target 48. This, in addition to the placement of the rotor 66 at the second end of the shaft 50, results in the anode assembly 40 having a center of gravity 57 that is positioned between the set of bearings proximal to the anode target 48 and the set of bearings distal to the anode target 48. Preferably, the axial distance from one set of bearings 67 to the center of gravity 57 is half of the distance from one set of bearings to the other 65 (i.e. the center of gravity 57 is centered between the bearings). This provides a rotor-dynamically stable, balanced anode assembly 40, minimizing unbalanced loading of the bearing balls 70 and bearing races 72. The center of gravity 57 may also be positioned along the axis of rotation 59 of the anode assembly 40.

As discussed above, the mounting hub attachment structures, the associated attachments 62 and 64, and the bearing assembly 52 are sensitive to heat. Thus, it is desirable to minimize the amount of heat conducted to these structures from the radially-extending target body 54. This may be accomplished by having an axially-extending target shaft 56 and mounting hub wall 61 of a predetermined diameter, thickness, and length, such that the thermal path from the target body 54 to the attachments 62 and 64, and to the bearing assembly 52, is minimized or restricted to a predetermined limit. This too is made possible by the gyroscopic effects created by spatially separating the target 48 and rotor masses 66.

The integrity of the mechanical joint between the target 48 and the mounting hub 60 and shaft 50 is preferably maintained throughout x-ray tube operation, since yielding at the mating surfaces may also ultimately result in rotor-dynamic problems and possible premature x-ray tube failure. Accordingly, various attachment mechanism may be utilized to maintain the joint. For example, one welding method enables the joining of at least two dissimilar, highly alloyed metals to form a weld that is crack resistant and ductile. A highly alloyed iron-based, low expansivity, gamma-prime strengthened superalloy (i.e. Pyromet Alloy CTX-909 manufactured by Carpenter Technology Corp., Reading, Pa. and Incoloy Alloy 903, Alloy 907 and Alloy 909 manufactured by Inco Alloys International, Huntington, W. Va.) is joined to a high-carbon, powder metallurgical, cobalt-free tool steel that is high in refractory metal alloying agents (i.e., CPM REX 20 manufactured by Crucible Materials Corp., Pittsburgh, Pa.).

Figure 4:
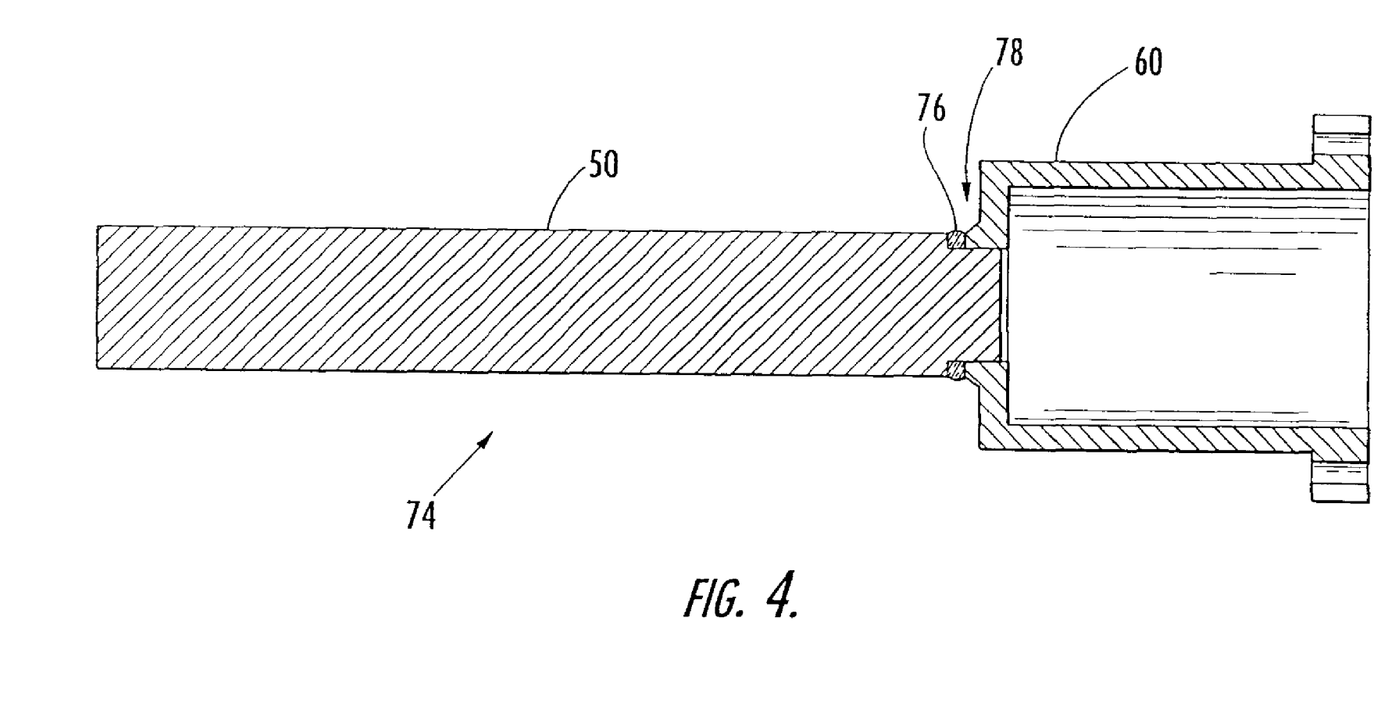
FIG. 4 is a cross-sectional view of a shaft-hub assembly including the weld joint of the present invention.
Figure 5:
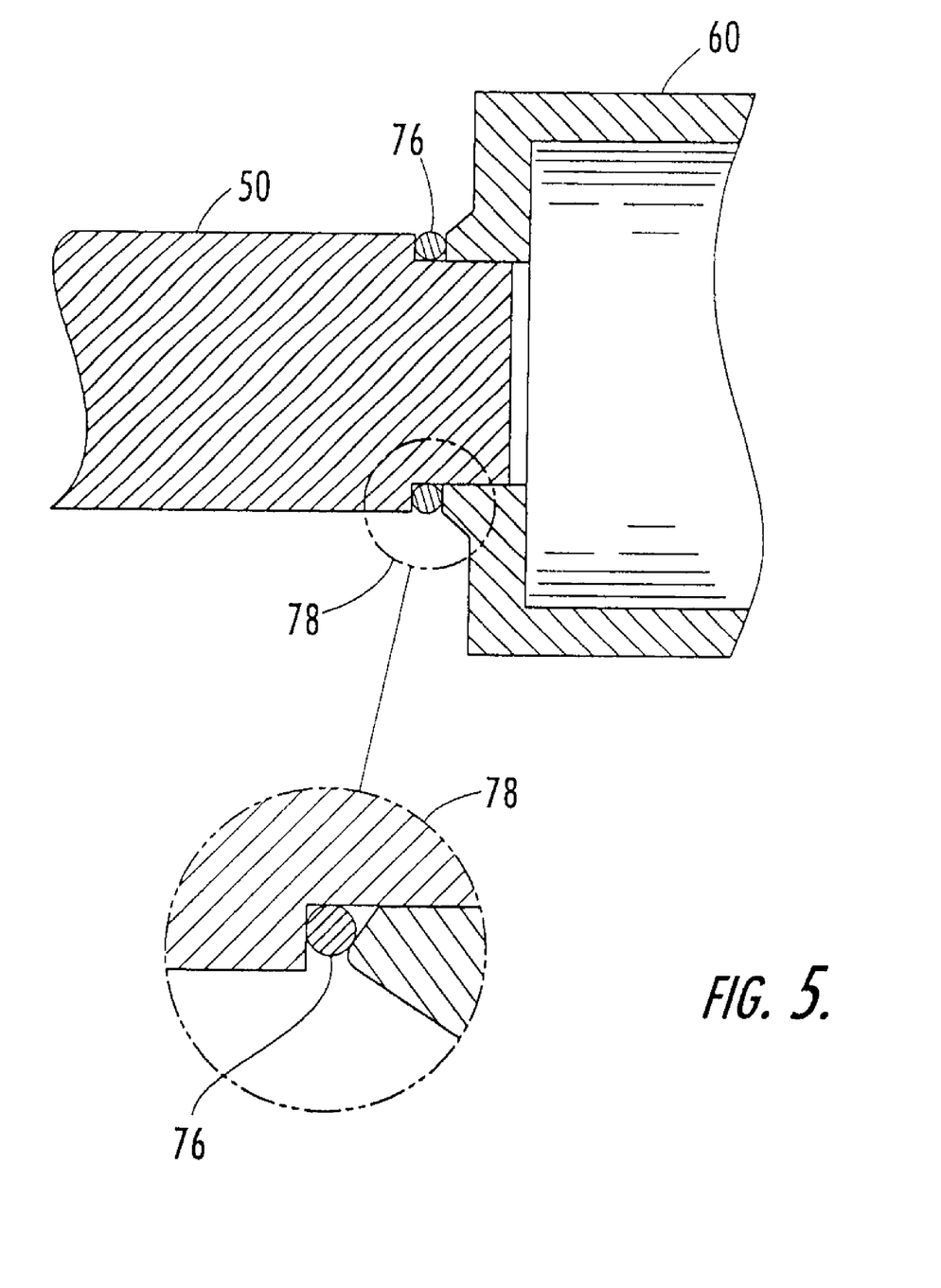
FIG. 5 is a cross-sectional view of the shaft-hub assembly of FIG. 4 with the weld joint exploded to reveal the geometry of the weld joint and the fortification of the weld joint with nickel.

Referring to FIGS. 4 and 5, one embodiment of a shaft-hub assembly 74 includes the shaft 50 fixedly attached to the hub 60 by utilizing, at least in part, a weld joint 78 that incorporates a nickel fill wire 76. The shaft-hub assembly 74 includes the following components: the shaft 50, the mounting hub 60, and the nickel fill wire 76. In FIG. 5, an exploded view of the weld joint 78 is shown. The weld joint 78 is formed between the hub 60 and the shaft 50. FIG. 5 further illustrates the positioning of the nickel fill wire 76 in the weld joint 78. The shaft 50 is fabricated from powder metallurgically produced CPM REX 20 tool steel, which has the following (nominal) chemical composition by weight:

| | |
|---|---|
| Carbon | 1.30% |
| Manganese | 0.35% |
| Silicon | 0.25% |
| Chromium | 3.75% |
| Vanadium | 2.00% |
| Tungsten | 6.25% |
| Molybdenum | 10.50% |
| Sulfur | 0.03% |
| Iron | balance |

Iron comprises about 75% by weight of the alloy. The shaft material has a liquidus temperature of about 1374 degrees C. Although the shaft 50 was fabricated from CPM REX 20 tool steel, other alloy materials may be used for the shaft 50 including, but not limited to, ASP23, REX M2HCHS, REX M3HCHS, REX M4, REX M4HS, HAPIO, and KHA33N (all manufactured by Carpenter Technology Corp., Reading, Pa.).

In carrying out the method, the hub 60 was fabricated from Pyromet Alloy CTX-909 superalloy, which has the following (nominal) chemical composition by weight:

| | |
|---|---|
| Carbon | 0.06% |
| Manganese | 0.50% |
| Silicon | 0.40% |
| Chromium | 0.50% |
| Cobalt | 14.00% |
| Titanium | 1.60% |
| Columbium + Tantalum | 4.90% |
| Aluminum | 0.15% |
| Copper | 0.50% |
| Boron | 0.012% |
| Sulfur | 0.03% |
| Nickel | 38.00% |
| Iron | balance |

Based upon this data, iron comprises approximately 40% of the alloy by weight. The melting temperature range of CTX-909 is about 1395 degrees C. to about 1432 degrees C., which is approximately 21 degrees C. higher than the liquidus of the CPM REX 20 bearing shaft material. Although the mounting hub 60 is fabricated from Pyromet Alloy CTX-909 superalloy, other superalloy materials may be used for the hub 60 including, but not limited to, Incoloy Alloy 903, 907, and 909 (all manufactured by Inco Alloys International, Huntington, W. Va.).

The nickel fill wire 76 is pure nickel wire (99.00% minimum by wt.) designated Electronic Grade "A" nickel, and has a liquidus temperature of about 1440 +/−5 degrees C. While the nickel that was used for fortification of the weld was a formed wire, a preformed washer, is also suitable.

To compare welds made with and without the nickel fill wire 76, welds were fabricated and analyzed using identical weld settings. Each hub 60 and shaft 50 were obtained from the same material lots. The recommended welding method is Gas-Tungsten Arc Welding (GTAW) also known as HeliArc welding, tungsten inert gas (TIG) or tungsten arc welding. Weld pool temperatures may approach about 2500 degrees C., and are aptly suited to melt the materials described in this process. The bearing shaft 50 is machined such that one end can be inserted into a machined hole in the mounting hub 60 as is shown in FIG. 4. Prior to insertion of the shaft 50 into the hub 60, the nickel fill wire 76, in the form of a ring, is placed over the shaft 50 up against the shoulder of the shaft 50 as depicted in FIG. 5. The shaft 50 with the nickel fill wire 76 are then press fit into the machined hole in the hub 60. Heating the hub 60 prior to insertion and, thus, expanding its diameter will facilitate assembly. The hub 60 is machined such that the joint configuration shown in FIG. 5 traps the wire 76 in the joint, and firmly locates its position throughout the entire weld process.

To make the circumferential weld necessary to produce the bearing shaft assembly 74, the pre-welded assembly shown in FIG. 4 is rotated about its axis with the welding torch brought up close against the joint. The torch tip is centered approximately on the centerline of the joint. It is then welded in a single pass to form the a weld joint. After a weld is made around the entire joint, the weld is terminated by a power ramp down while the part continues to rotate. The approximate weld parameters are as follows:

| | |
|---|---|
| Weld joint diameter | 0.75 in. |
| Nickel fill wire diameter | 0.025 in. |
| Average weld current | 80 Amperes |
| Weld speed at joint | 0.125 in/sec |
| Shielding gas | Argon |
| Post weld heat-treatment (immediately after weld) | 1000° F. for 2 hr. in air or inert gas then furnace cool |

Further, a Postweld Heat Treatment (PWHT) operation may be applied to temper the hardened regions of the Heat Affected Zone (HAZ) adjacent to the weld located, for example, in the Rex20 shaft 50. Without the PWHT, an underbead crack may form in the HAZ region of the shaft 50.

For the weld joint fabricated in the present invention, a 0.025 in. diameter wire ring supplied sufficient nickel content to inhibit crack formation in a circumferential weld with a diameter of about 0.75 in. A wire with a larger cross-sectional diameter will obviously increase the nickel content in the weld, and further enhance the ductility of the resultant weld joint.

Metallographic cross-sections of the welds were made with and without the nickel fill wire 76. Cracks were present in the weld that was constructed without the nickel fill wire 76. The cracks ran completely along the circumference of the weldbead. Conversely, the weld constructed with the nickel fill wire 76 was free of any type of cracks, resulting in a stronger, more ductile joint.

The results of an elemental analysis (in wt. %) performed on the welds both with and without a nickel fill wire 76 are shown below in Table 1. The analysis also included the ratios of selected elemental pairs. To replicate the analysis, one needs to evaluate the same select group of elements. The results shown are averages of Energy Dispersive X-Ray Spectrometry (EDS) scans taken longitudinally and laterally across a polished cross-section of each weld. The light element, carbon, could not be detected by the measurement system used in this analysis. However, carbon is present in the weld since CPM REX 20 contains about 1.3% carbon by weight. For calibration purposes, EDS measurements of both the CPM REX 20 and CTX-909 superalloy materials were taken and compared to the manufacturers' nominal values (shown in square brackets). The EDS measurements for both superalloy materials compared favorably with the manufacturers' values. The results of the calibration analysis are also included in the Table 1.

TABLE 1

| | CTX-909/ CPM Rex 20 weld + nickel fill wire | CTX-909/ CPM Rex 20 weld | CPM Rex 20 [literature values] | CTX-909 [literature values] |
|---|---|---|---|---|
| Iron (Fe) | 50.7 | 59.6 | 73.1 [75] | 41.4 [40] |
| Nickel (Ni) | 24.7 | 15.8 | NA | 36.2 [38] |
| Cobalt (Co) | 7.0 | 6.2 | NA | 15.1 [14] |
| Chromium (Cr) | 1.9 | 2.1 | 3.7 [3.8] | NA |
| Molybdenum (Mo) | 4.8 | 6.0 | 11.8 [10.5] | NA |
| Tungsten (W) | 3.7 | 4.6 | 8.4 [6.3] | NA |
| Niobium (Nb) | 4.9 | 3.2 | NA | 5.4 [4.9] |
| Titanium (Ti) | 1.0 | 1.0 | NA | 1.6 [1.6] |
| Vanadium (V) | 1.0 | 1.5 | 2.2 [2.0] | NA |
| Carbon (C) | NM | NM | NM [1.3] | NM [0.06] |
| Fe/Ni | 2.0 | 3.8 | NA | 1.1 [1.0] |

TABLE 1-continued

|  | CTX-909/<br>CPM Rex<br>20 weld +<br>nickel fill<br>wire | CTX-909/<br>CPM Rex<br>20 weld | CPM Rex<br>20<br>[literature<br>values] | CTX-909<br>[literature<br>values] |
|---|---|---|---|---|
| Fe/Co | 7.2 | 9.6 | NA | 2.7 [2.8] |
| Fe/Cr | 26.7 | 28.4 | 19.7 [19.7] | NA |
| Fe/Mo | 10.6 | 9.9 | 6.2 [7.1] | NA |
| Fe/W | 13.7 | 12.9 | 8.7 [11.9] | NA |
| Fe/Nb | 10.3 | 18.6 | NA | 7.7 [8.2] |

NM = not measured, NA = not applicable

The elemental analysis conducted here using Energy Dispersive X-Ray Spectrometry (EDS) shows that the nickel content in the weld increases by approximately 10% by weight, which indicates that the nickel fill wire 76 enriches the weld metal with nickel. Conversely, the iron content decreases by a similar amount. Pure nickel is ductile, non-hardenable, and has considerable solubility for most of the elements shown in Table 1. Also, nickel is not a carbide former, and exhibits a low solubility for carbon.

A weld composition rich in nickel will be ductile, and not crack upon cooling. Hence, to fabricate a crack free weld, it is necessary to add a sufficient quantity of nickel to the weld to obtain an iron-to-nickel ratio (Fe/Ni) of approximately two (2) or less for systems that have a combined weight % of iron and nickel (Fe+Ni) equal to or greater than 75%. Experimental analysis of welds with nickel additions between approximately 15 wt. % (no nickel fill wire 76) and approximately 24 wt. % exhibit, with increasing nickel additions, crack configurations ranging from complete circumferential centerline cracks to localized cracks at the weld termination (i.e. termination cracks, tail cracks). Consistently crack free welds were obtained with nickel additions greater than approximately 24.7 wt. % (i.e. 25 wt. %). Experimentation with various nickel wire diameters to obtain the desired 25 wt. % of elemental nickel in the weld metal is necessary for welds that are significantly larger or smaller than the joint described here.

FIG. 5 is a cross-sectional perspective view with the weld joint 78 exploded to reveal one type of construction of weld joint 78, and the incorporation of nickel fill wire 76 into the weld. The positioning of the nickel fill wire 76 ensures that it is exposed to the hot plasma flame of the torch, becomes completely liquid, and alloys thoroughly with the molten phases of the hub 60 and the bearing shaft 50 being joined together.

Analytical methods such as Energy Dispersive X-Ray Spectroscopy (EDS) and Inductively Coupled Plasma/Atomic Emission Spectroscopy (ICP/AES) can be used to determine the presence of the nickel addition in the weld metal. Both methods of analysis will measure higher nickel contents in welds that utilize this invention when compared to geometrically identical welds that are fabricated without it. For ICP/AES analysis, a small section of the weld metal must be cut from the joint and analyzed. For an accurate ICP/AES analysis, it is imperative that the weld metal, free of the base metal components, be analyzed.

Although the present invention has been described with reference to preferred embodiments, other embodiments may achieve the same results. Variations in and modifications to the present invention will be apparent to those skilled in the art and the following claims are intended to cover all such equivalents.

What is claimed is:

1. An anode assembly for use within an x-ray generating device, the anode assembly comprising:
   a shaft having a first end and a second end;
   a target connected to the first end of the shaft;
   a rotor connected to the second end of the shaft;
   a flexible interconnection between the target and the rotor, wherein the flexible interconnection comprises at least one annular wall, and wherein the at least one annular wall comprises a first annular wall attached to the target and a second annular wall attached to the shaft, the first annular wall concentric with the second annular wall; and
   wherein the first annular wall and the second annular wall define a continuous heat transfer path between the target and the shaft.

2. The anode assembly of claim 1, further comprising spaced-apart bearings rotatably supporting the shaft, the shaft, target, and rotor positioned relative to each other such that the center of gravity of the combination of the shaft, the target, and the rotor is positioned between the bearings.

3. The anode assembly of claim 2, wherein the shaft, target, and rotor are positioned relative to each other such that the center of gravity of the combination of the shaft, the target, and the rotor is substantially centered between the bearings.

4. The anode assembly of claim 1, wherein the target and rotor have independent vibrational modes.

5. The anode assembly of claim 1, wherein the first and second annular walls are of a predetermined length such that a thermal conductance from the target has a predetermined limit.

6. The anode assembly of claim 1, wherein the first and second annular walls are of a predetermined thickness such that a thermal conductance from the target has a predetermined limit.

7. An anode assembly for use within an x-ray generating device, the anode assembly comprising:
   a shaft having a first end and a second end;
   a target connected to the first end of the shaft;
   a rotor connected to the second end of the shaft;
   a flexible interconnection between the target and the rotor, wherein the flexible interconnection comprises at least one annular wall, and wherein the at least one annular wall comprises a first annular wall attached to the target and a second annular wall attached to the shaft, the first annular wall concentric with the second annular wall;
   wherein the first annular wall and the second annular wall define a continuous heat transfer path between the target and the shaft; and
   spaced-apart bearings rotatably supporting the shaft, the shaft, target, and rotor positioned relative to each other such that the center of gravity of the combination of the shaft, the target, and the rotor is positioned between the bearings.

8. The anode assembly of claim 7, wherein the shaft, target, and rotor are positioned relative to each other such that the center of gravity of the combination of the shaft, the target, and the rotor is substantially centered between the bearings.

9. The anode assembly of claim 7, wherein the target and rotor have independent vibrational modes.

10. The anode assembly of claim 7, wherein the first and second annular walls are of a predetermined length such that a thermal conductance from the target has a predetermined limit.

11. The anode assembly of claim 7, wherein the first and second annular walls are of a predetermined thickness such that a thermal conductance from the target has a predetermined limit.

12. An anode assembly for use within an x-ray generating device, the anode assembly comprising:
   a target having a radially-extending target body and an axially-extending target shaft, the radially and axially-extending portions forming an inner bore;
   a shaft;
   a hub coupling the target to the shaft, wherein the hub comprises an axially-extending annular wall, and wherein the axially-extending annular defines a heat transfer path between the target and the shaft;
   an attachment mechanism for coupling the shaft and the hub; and
   a bearing assembly, rotatably supporting the shaft, having a first set of bearings proximal to the target and a second set of bearings distal to the target, the bearing assembly at least partially disposed within the inner bore of the target.

13. The anode assembly of claim 12, wherein the center of gravity of said anode assembly is positioned between the first set of bearings and the second set of bearings.

14. The anode assembly of claim 12, wherein the attachment mechanism comprises a weld, the weld joint incorporating commercially pure nickel.

15. An anode assembly for use within an x-ray generating device, the anode assembly comprising:
   a target having a radially-extending target body and an axially-extending target shaft, the radially and axially-extending portions forming an inner bore;
   a shaft;
   a hub coupling the target to the shaft, wherein the hub comprises an axially-extending annular wall, and wherein the axially-extending annular defines a heat transfer path between the target and the shaft;
   an attachment mechanism for coupling the shaft and the hub; and
   a bearing assembly, rotatably supporting the shaft, having a first set of bearings proximal to the target and a second set of bearings distal to the target, the bearing assembly at least partially disposed within the inner bore of the target, the center of gravity of said anode assembly positioned between the first set of bearings and the second set of bearings.

16. The anode assembly of claim 15, wherein the attachment mechanism comprises a weld, the weld joint incorporating commercially pure nickel.

17. An x-ray system, comprising:
   a vacuum vessel having an inner surface forming a vacuum chamber;
   a shaft having a first end and a second end, the shaft supported by the vacuum vessel;
   an anode assembly disposed within the vacuum chamber, the anode assembly including a target connected to the first end of the shaft;
   a cathode assembly disposed within the vacuum chamber at a distance from the anode assembly, the cathode assembly configured to emit electrons that strike the target of the anode assembly and produce x-rays;
   a rotor connected to the second end of the shaft;
   a flexible interconnection between the target and the rotor, wherein the flexible interconnection comprises at least one annular wall, and wherein the at least one annular wall comprises a first annular wall attached to the target and a second annular wall attached to the shaft, the first annular wall concentric with the second annular wall;
   wherein the first annular wall and the second annular wall define a continuous heat transfer path between the target and the shaft; and
   spaced-apart bearings rotatably supporting the shaft.

18. The x-ray system of claim 17, wherein the shaft, target, and rotor are positioned relative to each other such that the center of gravity of the combination of the shaft, the target, and the rotor is positioned between the bearings.

19. The x-ray system of claim 18, wherein the shaft, target, and rotor are positioned relative to each other such that the center of gravity of the combination of the shaft, the target, and the rotor is substantially centered between the bearings.

20. The x-ray system of claim 17, wherein the target and rotor have independent vibrational modes.

21. The x-ray system of claim 17, wherein the first and second annular walls are of a predetermined length such that a thermal conductance from the target has a predetermined limit.

22. The x-ray system of claim 17, wherein the first and second annular walls are of a predetermined thickness such that a thermal conductance from the target has a predetermined limit.

23. The x-ray system of claim 17, wherein said x-ray system comprises a system selected from the group consisting of computed tomography, mammography, radiography, angiography, fluoroscopy, vascular, mobile, and industrial x-ray.

24. An x-ray system, comprising:
   a vacuum vessel having an inner surface forming a vacuum chamber;
   an anode assembly disposed within the vacuum chamber, the anode assembly including a target having radially and axially-extending portions forming an inner bore;
   a cathode assembly disposed within the vacuum chamber at a distance from the anode assembly, the cathode assembly configured to emit electrons that strike the target of the anode assembly and produce x-rays;
   a shaft supported by the vacuum vessel;
   a hub coupling the target to the shaft, wherein the hub comprises an axially-extending annular wall, and wherein the axially-extending annular defines a heat transfer path between the target and the shaft;
   an attachment mechanism for coupling the shaft and the hub; and
   a bearing assembly, rotatably supporting the shaft, having a first set of bearings proximal to the target and a second set of bearings distal to the target, the bearing assembly at least partially disposed within the inner bore of the target.

25. The x-ray system of claim 24, wherein the center of gravity of the anode assembly is positioned between the first set of bearings and the second set of bearings.

26. The x-ray system of claim 24, wherein the attachment mechanism comprises a weld, the weld joint incorporating commercially pure nickel.

27. The x-ray system of claim 24, wherein said x-ray system comprises a system selected from the group consisting of computed tomography, mammography, radiography, angiography, fluoroscopy, vascular, mobile, and industrial x-ray.

* * * * *